US010814857B2

(12) United States Patent
Buchberger et al.

(10) Patent No.: US 10,814,857 B2
(45) Date of Patent: Oct. 27, 2020

(54) WIRELESS AIR BRAKE TESTING AND INSPECTION

(71) Applicants: Klaus Buchberger, Oconomowoc, WI (US); Steven Novak, Oconomowoc, WI (US)

(72) Inventors: Klaus Buchberger, Oconomowoc, WI (US); Steven Novak, Oconomowoc, WI (US)

( * ) Notice: Subject to any disclaimer, the term of this patent is extended or adjusted under 35 U.S.C. 154(b) by 0 days.

(21) Appl. No.: 16/296,963

(22) Filed: Mar. 8, 2019

(65) Prior Publication Data
US 2019/0202427 A1  Jul. 4, 2019

Related U.S. Application Data

(63) Continuation-in-part of application No. 15/700,656, filed on Sep. 11, 2017, now abandoned.

(51) Int. Cl.
*B60T 17/22* (2006.01)
*G01M 17/08* (2006.01)
*G07C 5/00* (2006.01)
*B60T 13/66* (2006.01)

(52) U.S. Cl.
CPC .......... *B60T 17/228* (2013.01); *B60T 17/226* (2013.01); *B60T 13/665* (2013.01); *G01M 17/08* (2013.01); *G07C 5/008* (2013.01); *G07C 2205/02* (2013.01)

(58) Field of Classification Search
CPC ...... B60T 13/665; B60T 17/008; B60T 17/08; B60T 17/22; B60T 17/226; B60T 17/228; G07C 2205/02
See application file for complete search history.

(56) References Cited

U.S. PATENT DOCUMENTS

| 4,847,770 A | * | 7/1989 | Kane | B60T 13/665 701/20 |
| 5,747,685 A | * | 5/1998 | Skantar | B60T 17/228 303/3 |
| 6,126,247 A | * | 10/2000 | Paul | B60T 13/665 303/128 |

(Continued)

FOREIGN PATENT DOCUMENTS

WO   WO-9407729 A1 *  4/1994  ............ B60T 17/228

*Primary Examiner* — Nguyen Q. Ha
(74) *Attorney, Agent, or Firm* — Joseph S. Heino; Erin E. Kaprelian

(57) ABSTRACT

A system comprises a plurality of handheld devices including a plurality of transceivers. A control unit may be coupled to a handheld device of the plurality of handheld devices. The system may further include a plurality of end-of-train air devices coupled to a plurality of air brakes. An air manifold may be coupled to the plurality of air brakes. The system may include a controller coupled to the control unit and to the air manifold. A processor may be coupled to the controller and the control unit, and a non-transitory computer readable medium may be coupled to the processor. The non-transitory computer readable medium may include instructions executable to receive information from the control unit corresponding to an air brake test performed on the plurality of end-of-train air devices, determine a status of the air brake test, generate an inspection form based on the received information and the determined status, and transmit the generated inspection form for printing.

4 Claims, 2 Drawing Sheets

(56) References Cited

U.S. PATENT DOCUMENTS

| | | | | |
|---|---|---|---|---|
| 6,227,625 B1* | 5/2001 | Gaughan | ............... | B60T 13/665 |
| | | | | 303/15 |
| 2004/0122566 A1* | 6/2004 | Horst | ................... | B60T 17/228 |
| | | | | 701/2 |
| 2014/0081512 A1* | 3/2014 | Fugiel | ....................... | B60T 7/16 |
| | | | | 701/33.2 |

* cited by examiner

WIRELESS AIR BRAKE TESTING AND INSPECTION

PRIORITY

This application is a continuation-in-part of U.S. patent application Ser. No. 15/700,656, filed Sep. 11, 2017, and which claims priority from Provisional Application No. 62/393,482, filed on Sep. 12, 2016.

BACKGROUND

Air braking is used in multiple industries, including the railroad industry. When used as part of a train, air brakes are required to undergo regular testing and certification of proper function. Such testing and certification ensures proper function of the air brakes and compliance with applicable safety standards.

DETAILED DESCRIPTION

Figure 1:
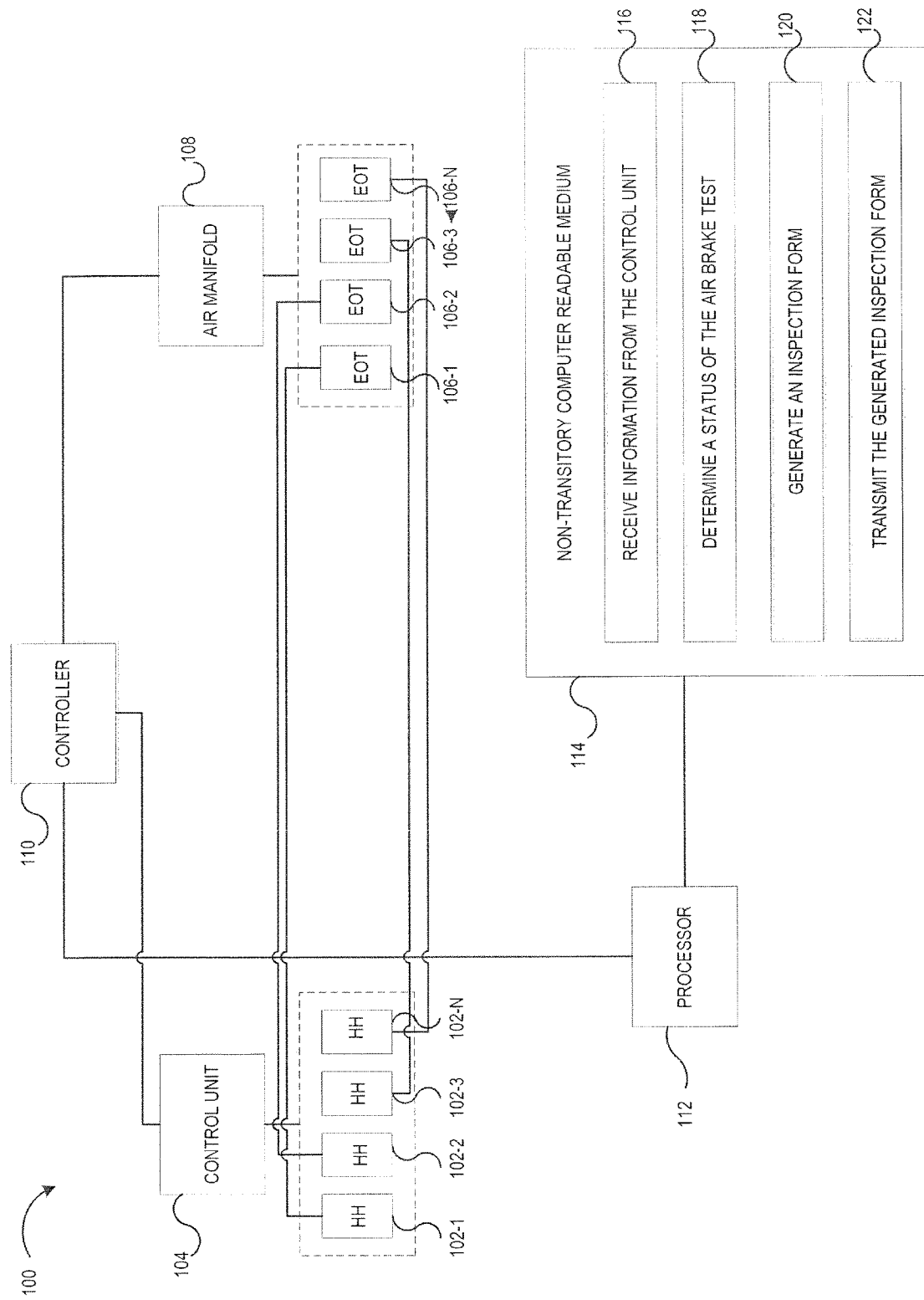
FIG. 1 is an example system for wireless air brake testing and inspection consistent with the present disclosure.

The use of air brakes is widely used in a number of industries. As used herein, an air brake refers to a type of friction brake, generally for vehicles, that relies on compressed air pressing on a piston to apply pressure to a break pad. An air brake may either be a parking brake, used to keep a vehicle from moving, or a service brake, used when a vehicle is in motion and needs to be slowed One industry that relies heavily on air brakes is the railway industry. Rail cars, such as those that make up a train when joined together, often have a number of air brakes. When joined to another rail car, the air brakes are also electronically joined, such that they are able to operate as a single system, allowing the train to safely brake when necessary.

Many railcars use a triple-valve system of air brakes. In a triple-valve system, the railcar brakes remain immovable when there is no air pressure applied. As long as there is no air pressure, the train will remain at rest. In order to release the brakes, and thus allow the train to move, the system must be pressurized. The pressurization of the triple-valve system may be referred to as charging and is the first function in the triple-valve system. Once the system is charged, i.e., has reached its required operating pressure, the brakes are freed, allowing the train to move.

When the train is moving, it may be slowed or stopped using the 'applying' function of the triple-valve system. The applying function uses decreases in air pressure to apply the brakes. As air pressure in the system decreases, the brakes move into an applied position. Once the system is fully depressurized, the brakes are fully applied, and only a re-pressurization will permit movement of the train again.

Due to the importance of being able to safely brake a train, including each of its component railcars, air brake testing is mandated by the Federal Railroad Administration. Air brake tests must be carried out on a regular basis and the results must be transferred to a report that is then carried within the train itself to certify a successful test. Such reports are generally filled out by hand during or immediately after the air brake test. This hand-filling of the reports increases the risk of accidental or purposeful misreporting of results, illegible results, and adds to the amount of time already used to perform an air brake test.

By contrast, the system of the present disclosure includes a wireless air brake testing system that includes generation and printing of a report. A plurality of handheld devices may be coupled to a control unit and a controller; the control unit and controller may further be coupled to a processor. As an air brake test is performed using the plurality of handheld devices, the results may be transmitted to the processor by the control unit and controller. Once the processor receives the information, instructions may determine a status of the air brake test, generate an inspection form, and transmit the generated form for printing or digital storage. In this way, the air brake test is able to be performed more quickly as it is entirely wireless, and the issues inherent in a handwritten report are eliminated.

FIG. 1 is an example system 100 for wireless air brake testing and inspection consistent with the present disclosure. System 100 includes a plurality of handheld units 102-1, 102-2, 102-3 . . . 102-N (collectively, handheld units 102). As used herein, a handheld unit refers to a handheld device, such as a mobile phone, tablet computer, or other similar portable device. Although four handheld units 102 are shown in FIG. 1, examples are not so limited and any number of handheld units may be used.

Handheld devices 102 may include a plurality of transceivers. As used herein, a transceiver refers to a device that comprises both a transmitter and a receiver. Because the transceiver includes both a transmitter component and a receiver component, a transceiver is able to both send and receive communications and signals, such as radio signals. The plurality of transceivers may be integrated into the plurality of handheld units 102 and, in some examples, each handheld unit of the plurality of handheld units 102 may include a separate transceiver.

System 100 may further include a control unit 104. Control unit 104 may be coupled to at least one handheld unit of the plurality of handheld units 102. In some examples, control unit 104 may be coupled to handheld unit 102 wirelessly and may communicate with the handheld unit 102 by the transceiver located therein. Although a single control unit 104 is shown, examples are not so limited and multiple control units 104 may be used. In such examples, each control unit 104 may be coupled to a separate handheld unit of the plurality of handheld units 102.

System 100 may include a plurality of end-of-train (EOT) devices 106-1, 106-2, 106-3 . . . 106-N (collectively end-of-train devices 106). As used herein, an EOT device refers to a device designed to send a pressure reading metric from an air brake located on a railcar to a control unit and to a handheld device, such as control unit 104 and handheld device 102. Although four EOT devices 106 are shown in FIG. 1, examples are not so limited, and any number of EOT devices 106 may be used. The number of EOT devices 106 and the number of handheld devices 102 may be the same; that is, there may be one EOT device 106 for each handheld device 102.

EOT devices 106 may be manufactured as a stand-alone unit, used when a client does not have an existing EOT device to monitor air pressure, or may be an integrated device, such as an integrated chip set, designed to be incorporated into an existing EOT device. In either case, EOT devices 106 may include a transceiver or other means of wireless communication, and may be coupled to an air brake located on a railcar.

EOT devices 106 may be coupled to handheld devices 102. In some examples, EOT devices 106 may be wirelessly coupled to, and thus communicate with, handheld devices 102, through transceivers, Wi-Fi, or any other wireless connection and communication method. A single EOT device 106 may be coupled to a corresponding handheld device 102; for example, EOT device 106-1 may be coupled to handheld device 102-1; however, examples are not so limited, and multiple EOT devices 106 may be coupled to a single handheld device 102, or vice versa.

An air manifold 108 may be coupled to EOT devices 106. As used herein, an air manifold refers to a structure designed to supply air, and air pressure, to a location as desired. In the present system 100, air manifold 108 may provide air pressure to the plurality of air brakes located on a railcar. More particularly, air manifold 108 may be used to provide air pressure to air brakes as part of a wireless air brake test (discussed further herein).

System 100 may further include a controller 110. As used herein, a controller refers to a device used to operate, regulate, or otherwise control a portion, or entirety, of a system. Controller 110 may be coupled to air manifold 108 and may thus be used to control when air pressure is provided by the air manifold 108 to air brakes, as well as the amount of air pressure provided. This connection may be wireless or wired. Controller 110 may further be coupled to control unit 104, either wirelessly or by a wired connection.

To perform an air brake test using system 100, a handheld device 102 and an EOT device 106 (or a plurality thereof) are taken to an end of a railcar. As previously mentioned, the particular handheld device 102 and EOT device 106 may be matched, or coupled to one another such that they are in communication. Moreover, handheld device may be coupled to control unit 104. Handheld device 102 may receive an input to begin a test, which may be transmitted to the control unit 104. The control unit 104 may then transmit instructions to the controller 110 to begin the test. As discussed previously, the air manifold 108 may be coupled to the controller 110 and, when controller 110 receives instructions to begin an air brake test, controller 110 may transmit a signal to air manifold 108 to an air brake. The EOT device 106 may be coupled to the air brake such that, as the air brake is both receiving air and as air is being removed from the air brake during the test, EOT device 106 is able to monitor the air pressure. These pressure readings may be transmitted from the EOT device 106 to its corresponding handheld device 102 and/or to controller 110.

System 100 may further include a processor 112. Processor 112 may be one or more central processing units (CPUs), microprocessors, and/or other hardware devices suitable for retrieving and executing instructions stored on a storage medium. As an alternative, processor 112 may include one or more electronic circuits containing a number of electronic components for performing functionality of the stored instructions. Processor 112 may be coupled to controller 110 such that controller 110 is able to communicate with processor 112. The communication may occur wireless or via a wired connection between processor 112 and controller 110.

Processor 112 may be coupled to a non-transitory computer readable medium 114. As used herein a non-transitory computer readable medium may be any electronic, magnetic, optical, or other physic storage device that stores executable instructions. Thus, non-transitory computer readable medium 114 may be, for example, RAM, an Electronically-Erasable Programmable Read-Only Memory (EEPROM), a storage drive, an optical disc, and the like. Non-transitory computer readable medium 114 may further be a portable, external, or remote storage medium that allows processor 112 to download instructions from said storage medium. Non-transitory computer readable medium 114 may include instructions, such as instructions 116, 118, 120, and/or 122, for wireless air brake testing and inspection consistent with the present disclosure.

Instructions 116 may include instructions executable by processor 112 to receive information from the control unit 104. The control unit 104 may transmit information via controller 110, which may in turn be coupled to processor 112, as shown in FIG. 1. In some examples, the information received from the control unit 104 may be information corresponding to an air brake test performed on the air brakes at the plurality of EOT devices 106.

Instructions 116 may further comprise instructions executable by processor 112 to obtain information corresponding to an air brake test at control unit 104. As previously described, control unit 104 may be in communication with handheld devices 102, which may in turn be in communication with EOT devices 106. In some examples, information may be received from the control unit concurrent with the air brake test. That is, instructions 116 may comprise instructions executable to obtain information corresponding to an air brake test during the performance of the air brake test. In other examples, instructions 116 may include instructions to store the obtained information corresponding to the air brake test for a duration of the air brake test. In such examples, the obtained information may be stored at the control unit 104 for the duration of the air brake test, or may be stored within processor 112.

Instructions 116 may further include instructions executable by processor 112 to transmit the obtained information from the control unit 104 to the non-transitory computer readable medium 114. The transmission of the obtained information to the non-transitory computer readable medium 114 may occur as information is received at the control unit 104 or may occur once the air brake test is complete. Regardless of when the obtained information is transmitted to computer readable medium 114, instructions 116 may further include instructions to compile the obtained and received information.

Instructions 118 may include instructions executable by processor 112 to determine a status of the air brake test. Instructions 118 may include instructions to determine an amount of air leakage. The amount of air leakage may be determined based on the information received at instructions 116, from the control unit 104. Instructions 118 may further include instructions to determine whether the amount of air leakage is above or below a threshold amount of air leakage. As used herein, a threshold amount of air leakage refers to an amount of air leakage determined to be acceptable or safe, with such determination generally made by a regulating body.

If, at instructions 118, a determination is made that the amount of air leakage is above a threshold amount of leakage, instructions 118 may include instructions executable to determine that the air brake test is a failed test. The determined status of the air brake test is thus "fail". However, if a determination is made that the amount of air leakage is below a threshold amount of leakage, instructions 118 may include instructions executable to determine that the air brake test is a passed test. The determined status of the air brake test is thus "pass".

Instructions 120, when executed by processor 112, may include instructions executable to generate an inspection form. The inspection form may be an inspection form similar to the ones currently filled out by hand for air brake inspections, and may comport with any regulations and requirements set by safety agencies. Instructions 120 may include instructions executable to retrieve an inspection form. The inspection form may be retrieved from, for example, an oversight body's website or from a stored set of inspection forms.

Instructions 120 may further include instructions executable to populate the inspection form. Population of the inspection form may include populating the inspection form with identifying information, such as the name of the company, the location of the rail yard where the air brake test is being performed, and the number of railcars making up the train. Of course, examples are not so limited, and other or additional identifying information may be included.

Population of the inspection form at instructions 120 may further include populating the inspection form with the information received at instructions 116 and/or the determined status of the air brake test determined at instructions 118. In some examples, the status of the air brake test may include a statement that the train referred to by the populated identifying information has passed or failed the required test. In the case of a failed test, the generated instruction form may include information regarding which particular railway car or cars had an amount of leakage above the threshold amount and the degree to which the amount of leakage was above the threshold amount.

Upon complete population of the inspection form, instructions 120 may include instructions executable to transmit the generated inspection form to a third party computing device. The third party computing device may, for example, be a central computing device of a rail yard or may be a computing device connected to a regulation agency. Transmission of the generated instruction form may occur wireless or may occur via a wired connection between the third party computing device and processor 112.

Instructions 122, when executed by processor 112, may include instructions executable to transmit the generated inspection form for printing. Printing may occur at a printing device located on a rail yard or located at a remote location. Instructions 122 may transmit the generated inspection form for printing concurrent with, or prior or subsequent to, transmission of the generated inspection form to a third party computing device at instructions 120.

Figure 2:
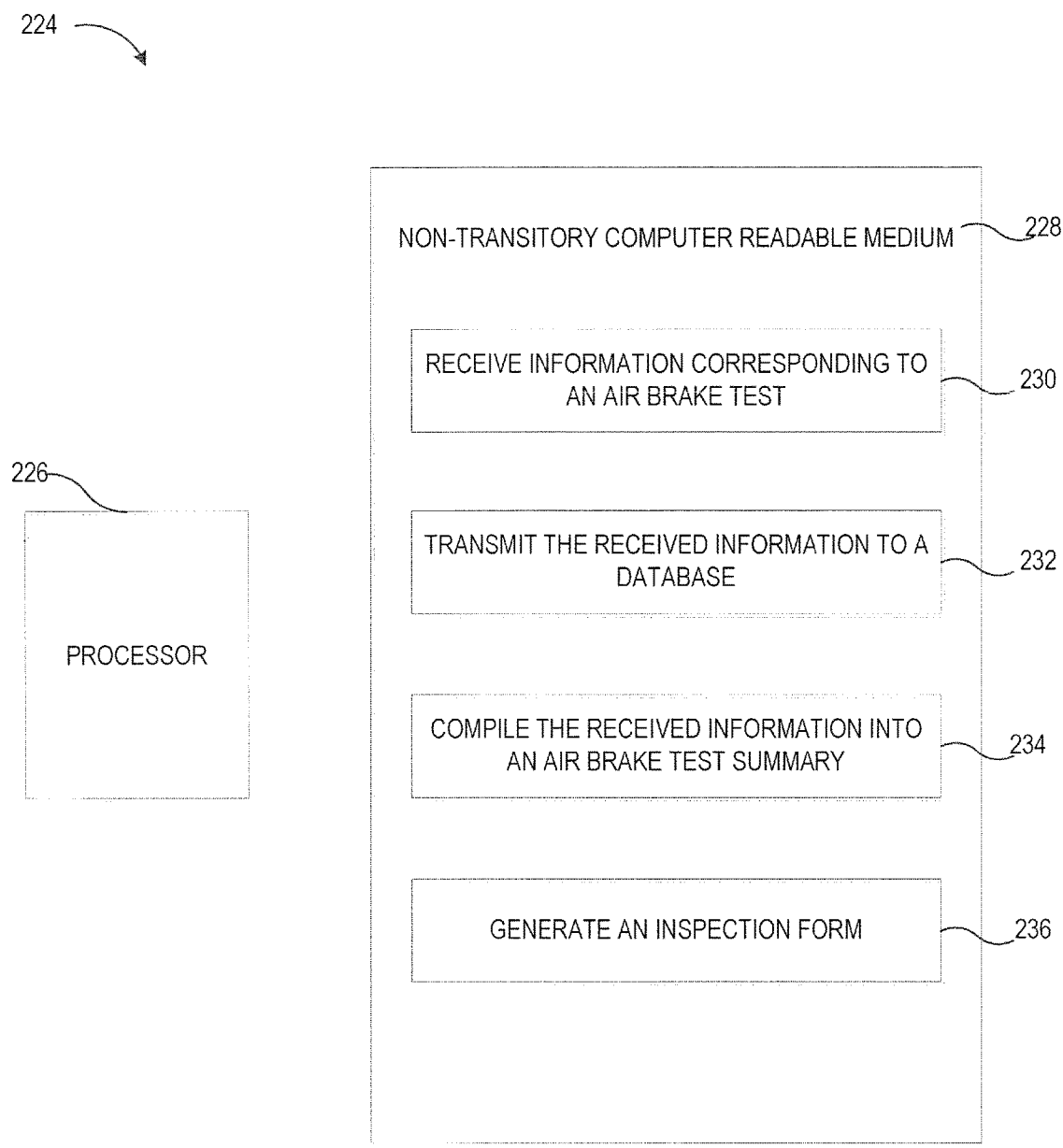
FIG. 2 is another example system for wireless air brake testing and inspection consistent with the present disclosure.

FIG. 2 is another example system 224 for wireless air brake testing and inspection consistent with the present disclosure. System 224 may include a processor 226. Processor 226 may be one or more central processing units (CPUs), microprocessors, and/or other hardware devices suitable for retrieving and executing instructions stored on a storage medium. As an alternative, processor 226 may include one or more electronic circuits containing a number of electronic components for performing functionality of the stored instructions.

Processor 226 may be coupled to a non-transitory computer readable medium 228. As used herein a non-transitory computer readable medium may be any electronic, magnetic, optical, or other physic storage device that stores executable instructions. Thus, non-transitory computer readable medium 228 may be, for example, RAM, an Electronically-Erasable Programmable Read-Only Memory (EEPROM), a storage drive, an optical disc, and the like. Non-transitory computer readable medium 228 may further be a portable, external, or remote storage medium that allows processor 226 to download instructions from said storage medium. Non-transitory computer readable medium 228 may include instructions, such as instructions 230, 232, 234, and/or 236 for wireless air brake testing and inspection consistent with the present disclosure.

Instructions 230, when executed by a processor such as processor 226, may include instructions to receive information corresponding to an air brake test of a train. In some examples, the information corresponding to the air brake test may be received from a remote handheld device, such as handheld devices 102, discussed previously with respect to FIG. 1. As discussed with respect to FIG. 1, handheld devices such as handheld devices 102 may include a transceiver, allowing information to be transmitted, and thus received, wirelessly. However, examples are not so limited and the information corresponding to the air brake test may be received over a wired connection.

Instructions 232 may include instructions executable by processor 226 to transmit the received information to a database. As used herein, a database refers to a collection of information that is kept together in a particular location for easy access and reference. The database may include prior received information for a particular train. Said differently, the database may include previous air brake test results over a period of time for the particular train being tested. In some examples, each train on a rail yard may have its own database, with previous air brake tests being stored in each train's particular database. The database may further be accessible outside of performance of an air brake test; for example, an overseer of a rail yard or a company employee may be able to access the database for one or multiple trains to track historical performance and trends.

Instructions 232 may further include instructions executable to store the received information. In such examples, the received information may be stored at, for example, processor 226 for a period of time. For instance, the received information may be stored for the duration of the air brake test. When the air brake test is complete, instructions 232 may include instructions executable to receive a confirmation that the air brake test is complete. This confirmation may originate with a handheld device, such as handheld device 102, or from a controller, such as controller 110, both discussed previously with respect to FIG. 1.

Upon receipt of the confirmation that the air brake test is complete, instructions 232 may include instructions executable to transmit the received, and stored, information to the database. Thus, information corresponding to the entirety of the air brake test is transmitted at one time. However, examples are not so limited. Instructions 232 may alternately include instructions executable to continuously transmit the received information to the database. That is, instructions 232 may include instructions to transmit the received information simultaneously with performance of the air brake test, allowing information to be transmitted to the database as soon as it is received, throughout the duration of the air brake test. This may be desirable when storage space is limited.

Instructions 234, when executed by a processor such as processor 226, may include instructions executable to compile the received information into an air brake test summary. As described with respect to FIG. 1, the air brake test summary may include information such as whether the train passed or failed the air brake test. The air brake test summary may also include information such as duration of time taken to perform the air brake test, location of the train, and date and time of the air brake test itself. In some examples, instructions 234 may include instructions to retrieve identifying information for the train, such as location, owner, and number of railcars making up the train.

Instructions 236 may include instructions executable by processor 226 to generate an inspection form. As described with respect to FIG. 1, the inspection form may be a standardized-type form for reporting and tracking the passage or failure of an air brake test by a train. The inspection form may be generated based on the information received and compiled at instructions 230, 232, and/or 234. In some examples, the generated information form may include a prior result of an air brake test taken from the database. This may be used to show a change in result or to track leakage over time for a particular railcar or train.

System 224 may further include instructions executable by processor 226 to transmit the generated inspection form to a printing device. As discussed with respect to FIG. 1, the printing device may be local, e.g., on the rail yard, or may be remote, e.g., located in an office. Once the generated inspection form is transmitted to the printing device, the printing device may print the generated inspection form for future use.

System 224 may include instructions executable by processor 226 to transmit the generated inspection form to a remote computing device. The remote computing device may be located within the rail yard or may be outside the rail yard. In either example, transmission of the generated inspection form to the remote computing device may occur wirelessly or through a wired connection. Moreover, transmission of the generated inspection form to the remote computing device may occur prior to transmission to the printing device, subsequent to transmission to the printing device, or simultaneously with transmission to the printing device.

In some examples, a handheld device, such as handheld devices 102, may communicate with a system such as system 224 through a mobile application. As used herein, a mobile application, or app, refers to a set of instructions designed to fulfill a discrete and particular purpose, such as coordinating performance of an air brake test. In such examples, the app may receive the information from the EOT devices, such as EOT devices 106, and may transfer the information through the app to a processor, such as processor 112, discussed with respect to FIG. 1, or processor 226.

In the foregoing detailed description of the present disclosure, reference is made to the accompanying drawings that form a part hereof, and in which are shown by way of illustration how examples of the disclosure may be practiced. These examples are described in sufficient detail to enable those of ordinary skill in the art to practice the examples of this disclosure, and it is to be understood that other examples may be utilized and that process and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and relative scale of the elements provided in the figures are intended to illustrate the examples of the present disclosure and should not be taken in a limiting sense.

The invention claimed is:

1. A non-transitory computer readable medium including instructions executable by a processor to:
   receive information corresponding to an air brake test of a train from a remote handheld device;
   determine a status of the air brake test;
   transmit the received information to a database, wherein the database includes prior received information for the train;
   compare the received information to the prior received information for the train, wherein comparing the received information to the prior received information further comprises:
      determining a change in a result of the air brake test; and
      tracking an amount of leakage over time for the train;
   compile the received information into an air brake test summary, wherein the air brake test summary includes the comparison of the received information to the prior received information; and
   generate an inspection form based on the received and compiled information.

2. The non-transitory computer readable medium of claim 1, further comprising instructions executable to:
   transmit the generated inspection form to a printing device; and
   transmit the generated inspection form to a remote computing device.

3. The non-transitory computer readable medium of claim 1, wherein the instructions to transmit the received information to a database include instructions executable to:
   store the received information;
   receive a confirmation that the air brake test is complete; and
   transmit the received information upon receipt of the confirmation of completion of the air brake test.

4. The non-transitory computer readable medium of claim 1, wherein the instructions to transmit the received information to a database include instructions executable to continuously transmit the received information throughout a duration of the air brake test.

* * * * *